United States Patent Office 3,664,820
Patented May 23, 1972

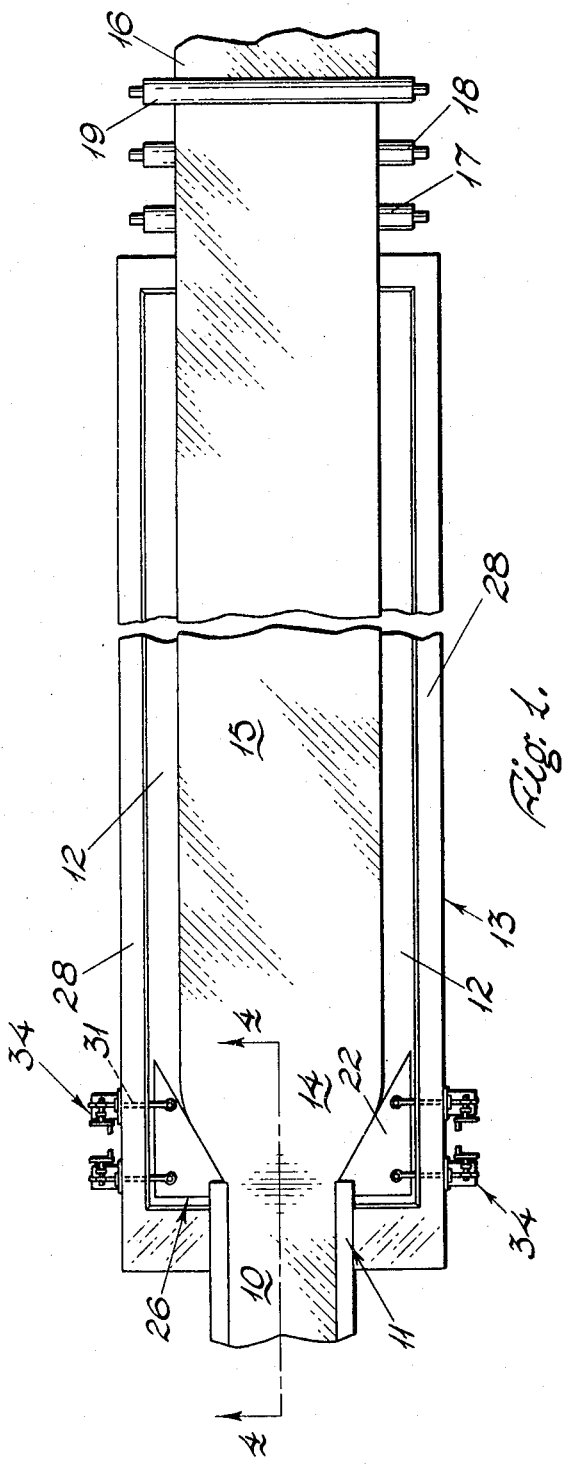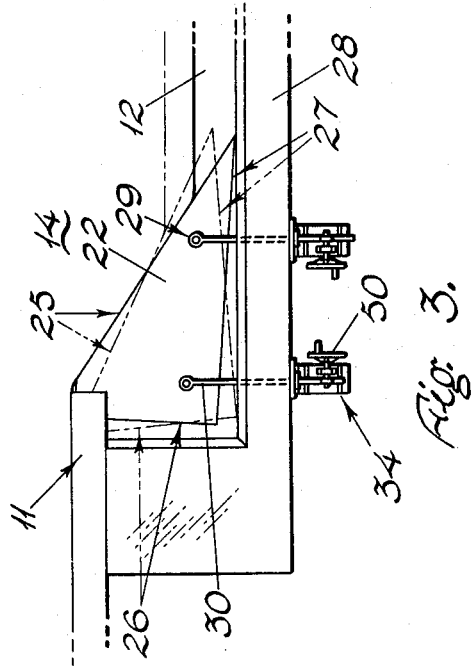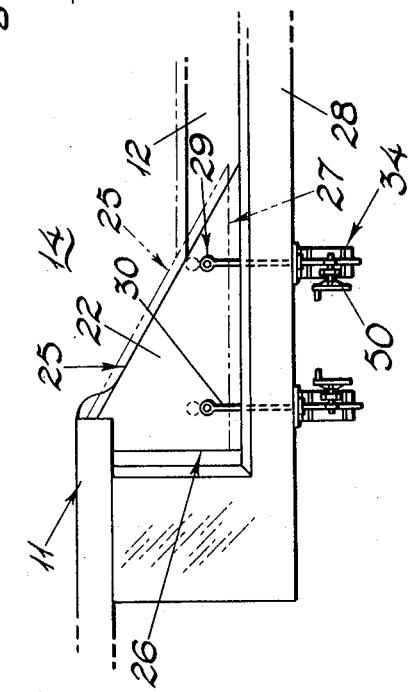

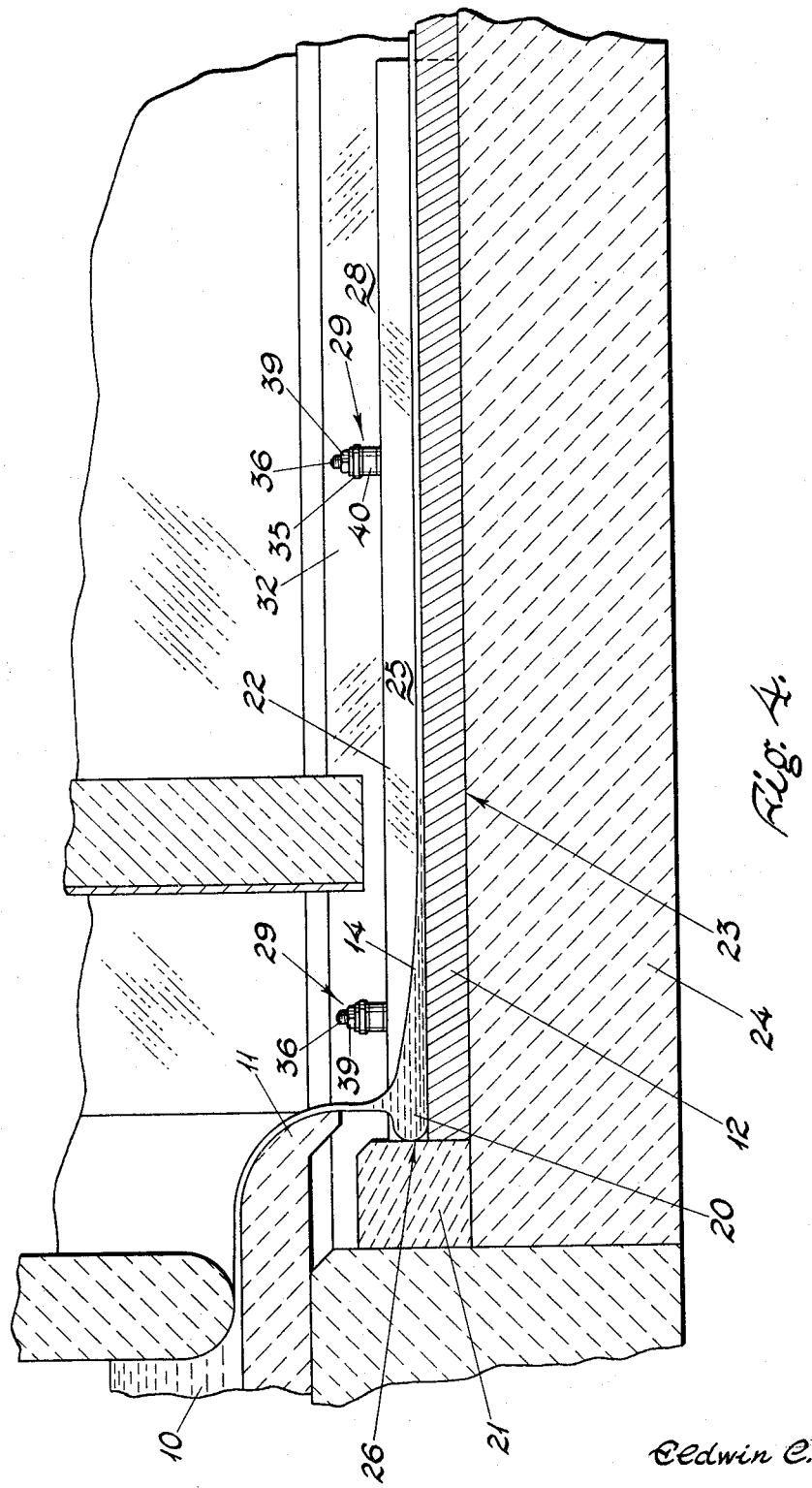

3,664,820
MOVABLE RESTRICTOR TILES IN FLOAT GLASS APPARATUS AND METHOD OF REGULATING GLASS RIBBON
Eldwin C. Montgomery, Modesto, Calif., assignor to Libbey-Owens-Ford Company, Toledo, Ohio
Filed Dec. 16, 1969, Ser. No. 885,430
Int. Cl. C03f
U.S. Cl. 65—99 A                    8 Claims

ABSTRACT OF THE DISCLOSURE

Controlling the directional flow of the initial buoyant body of molten glass received on the bath of a float glass apparatus to assist in guiding the ribbon down the bath. The restrictor tiles are made adjustable both pivotally and laterally. One end of each of two spaced, horizontal rods is pivotally attached to each restrictor tile. Each rod connects through an opening in the tank sidewall to an independent, conventional means capable of advancing and retracting same, thereby allowing independent adjustment thereof.

BACKGROUND OF THE INVENTION

Field of the invention

The present invention relates broadly to the manufacture of flat glass by the float process, and more particularly to a method and apparatus for controlling the direction of the ribbon along the bath by laterally adjusting the restrictor tiles in a manner to prevent the ribbon from veering to one side or the other as it moves down the bath.

Description of the prior art

A conventional form of float glass apparatus is illustrated and described in U.S. Pat. No. 3,083,551, granted Apr. 2, 1963, and, as there explained, the manufacture of flat glass by the float process involves the delivery of glass at a controlled rate onto a bath of molten metal (such as tin or an alloy of tin, for example) and advancing it along the bath under physical and thermal conditions which assure (1) that a layer of molten glass will be established on the bath, (2) that the glass in the layer can flow to form on the surface of the bath a buoyant body of molten glass of equilibrium thickness, and (3) that the buoyant body will be continually advanced along the bath in ribbon form and progressively and sufficiently cooled to permit it to be taken out of the bath at the exit end thereof by mechanical means without harm to its surfaces.

In the prior art it has been discovered that employment of restrictor tiles which can be wet by the glass to initially restrict the divergent flow of the molten glass supplied from the spout onto the molten metal bath improves the uniformity of the width and thickness of the equilibrium layer produced therefrom, and thereby improves the quality of the ultimate product.

In the prior art systems, however, improper positioning of the stationary restrictor tiles caused the ribbon of glass to have a tendency to veer to one side or the other as it progressed down the bath. This could result in the ribbon striking the refractory edges of the bath and thereby damaging the glass, or in the ribbon being out of position to be properly handled by the mechanical means used to transfer the ribbon to the lehr.

SUMMARY OF THE INVENTION

According to the present invention, the problem of the glass veering to one side or the other on the bath due to improper positioning of the restrictor tiles is overcome by providing a single tile on each side of the spout which is readily adjustable, both laterally and pivotally, and both before and during operation of the bath.

It is, therefore, a primary object of the invention to provide in a float glass bath restrictor tiles which can be adjusted during operation of the bath to control the direction of movement of the ribbon along the bath.

Another object is to provide a single tile on each side of the spout assembly which both controls the initial lateral flow of the molten glass on the bath and steers the course of the ribbon along the bath.

Further objects and advantages of the invention will become apparent during the course of the following description, when taken in connection with the accompanying drawings.

BRIEF DESCRIPTION OF THE DRAWINGS

In the accompanying drawings, wherein like numerals refer to like parts throughout the same:

FIG. 1 is a plan view of a representative form of float glass producing apparatus with plenum chamber removed illustrating the invention;

FIG. 2 is an enlarged, fragmentary plan view of the restrictor tile area of FIG. 1 showing in broken lines an alternate position to which the restrictor tile may be laterally adjusted;

FIG. 3 is a view similar to FIG. 2, but depicting alternate positions to which the restrictor tile may be pivotally adjusted;

FIG. 4 is an enlarged, fragmentary, longitudinal, sectional view taken substantially along line 4—4 of FIG. 1;

DESCRIPTION OF THE PREFERRED EMBODIMENTS

Figure 5:
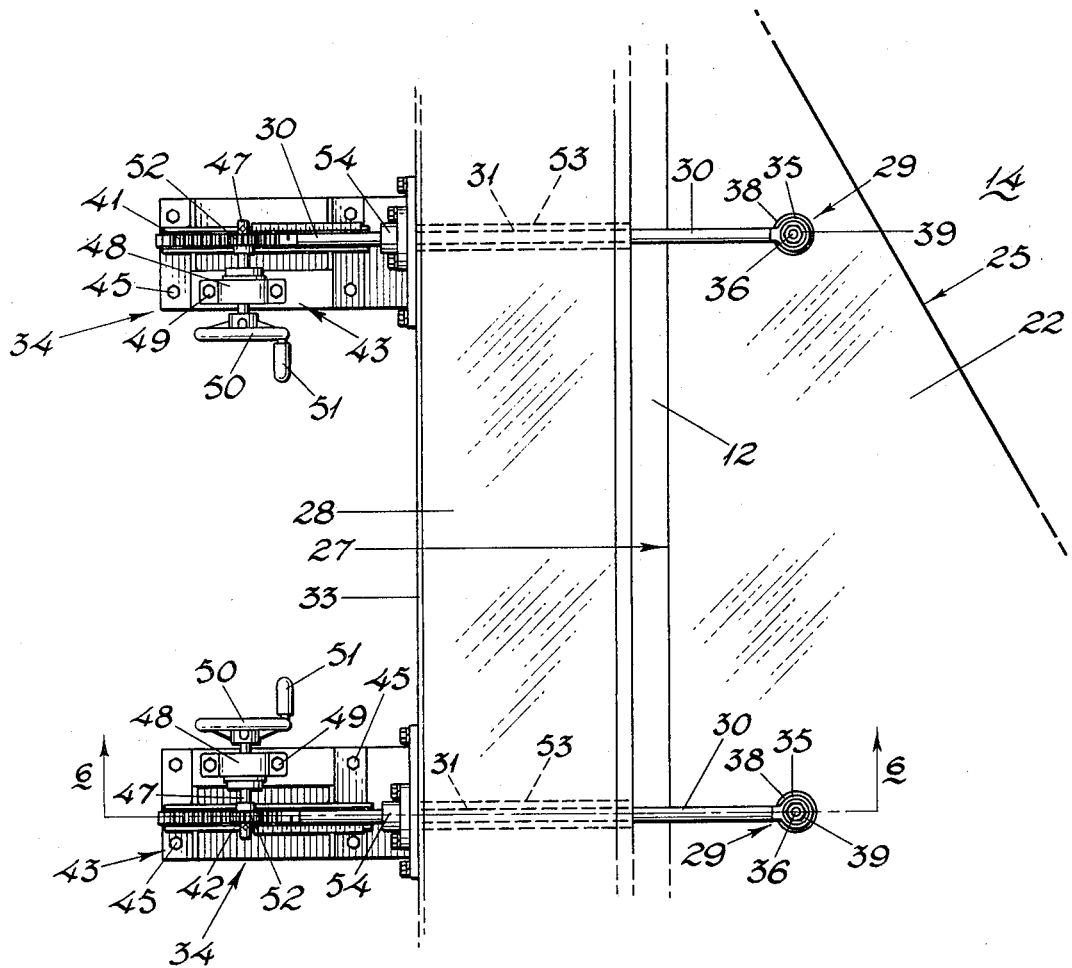
FIG. 5 is an enlarged, fragmentary, plan view of the restrictor tile-sidewall-mechanism area of FIG. 1.

Referring now more particularly to the drawings, FIG. 1 depicts a section through a typical float glass producing machine to which molten glass is supplied from the forehearth of a glass melting furnace (not shown) in an amount regulated by conventional tweel (not shown) and gate means 9 (FIG. 4). The molten glass 10 flows through and over a spout 11 onto a molten metal bath 12 contained in a tank structure 13, to form a buoyant layer of molten glass, indicated at 14. A buoyant body of stable thickness, indicated at 15, develops in ribbon form therefrom. This stable or equilibrium layer is progressively cooled as it advances along the bath and achieves a condition of sufficient stability such that the ultimate ribbon 16 may be transfered unharmed from the exit end of the bath to an adjacent lehr by mechanical means. One form of mechanical conveying means often used is comprised of a series of spaced supporting rollers as shown at 17 and 18 located beneath the ribbon and a top roller 19 superimposed congruently over another support roller in the series (not shown). Any or all of such rollers may be driven by conventional means to apply a tractive effort to the ribbon of glass sufficient to advance it along the bath toward the discharge end thereof. The speed of the rollers may be increased, thereby modifying their tractive effort and attenuating the equilibrium layer 15 when a ribbon of less than equilibrium thickness is desired.

In addition to the tractive force imparted to the glass ribbon, the pouring operation itself imparts a forward momentum to the buoyant layer 14 thus introduced onto the bath 12. As best seen in FIG. 4, the molten glass 10 undergoes a free fall of several inches onto the bath, and the buoyant layer thus developed is allowed to flow freely longitudinally along the bath. Rearward of the spout a heel section develops at 20, and a wetback block 21 is provided to engage the glass and assure continued flow and regeneration of the heel.

It has been found that some initial control of the lateral flow of the buoyant layer 14 introduced onto the molten metal bath 12 facilitates maintaining the desired dimensional stability in both the thickness and width of the ribbon produced. One basis for the present invention is the discovery that considerable side-to-side veering of the ribbon may take place, however, if the tiles used to initially restrict the lateral flow of the molten glass are not placed symmetrically with the tank centerline. This veering may also occur due to changing conditions during extended periods of operation.

A more important basis of the invention is the discovery that the veering of the ribbon can be prevented and the width of the ultimate ribbon more effectively controlled by providing adjustable restrictor tiles which may be moved as required during the operation of the bath.

To this end, congruent, refractory restrictor tiles 22 are located within the bath on either side of the spout 11 (FIGS. 1 and 4) extending from the wetback block 21 beyond the spout. The tiles rest on the firm surface 23 of the ceramic refractory bath bottom blocks 24 and extend vertically above the level of the bath, to thereby present restrictive vertical surfaces 25 to the spreading body of molten glass emanating from the spout 11. The tiles are generally triangular in shape having a side 26 located adjacent and substantially parallel to the wetback block 21 to prevent the lateral flow of molten glass along the wetback block 21 beyond the tile surface 25. The third side 27 (FIG. 6) may be parallel to the tank sidewall 28 for ease of alignment and symmetrical positioning.

Thus, the molten glass 10 is, in effect, poured into a conically shaped channel formed by the wetback block 21 and the opposing, diverging surfaces 25 of the tiles 22 and flows therealong in continual contact with those surfaces which control and direct the lateral spread of the buoyant layer 14. The adjustability of the tiles 22, described below in greater detail, enables the initial width, direction and rate of development of the stable or equilibrium layer 15 from the buoyant body 14 to be controlled with much greater ease and flexibility.

Figure 6:
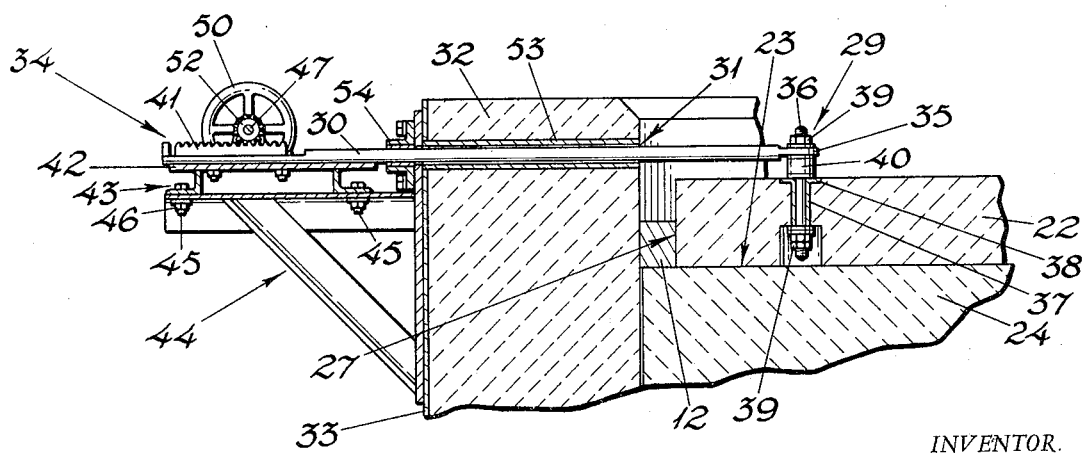
FIG. 6 is a vertical sectional view taken substantially along line 6—6 of FIG. 5.

As best illustrated in FIGS. 5 and 6, each of the two restrictor tiles 22 is pivotally connected at points 29 to a pair of rods 30 which extend through openings 31 in the tank side ceramic refractory blocks 32 and casing sideplate 33 to a means of independently advancing and retracting the rods at 34. The connection points 29 are located on a line parallel to the side 27 of the tiles 22 adjacent the tank sidewall 28 so that an equal extension of the rods 30 aligns the edge 27 parallel to the tank sidewall 28.

The pivotal connections 29 may be achieved by journaling eyes 35 of the rods 30 on vertical shafts 36 extending through openings 37 in the tiles 22. Each vertical shaft 36 is retained by a sleeve 38 and end nuts 39. A spacer 40 prevents contact between the rod 30 and the top of the restrictor tile 22. Each opening 37 has a counter bore at the bottom in which the shaft 36 and nuts 39 are recessed so as to not interfere with the free movement of the tile 22 over the bottom blocks 24.

Any suitable device may be provided for axially moving the rods 25 to thereby adjust the tiles 22. FIGS. 5 and 6 illustrate one such device. Thus, each of the rods 30 is fitted with a rack 41 and is slidably mounted on a top bar 42 of a mounting base 43 which, in turn, is rigidly affixed to a support structure 44 as by bolts 45 with nuts 46. A shaft 47 mounted in and journaled by a pillow block bearing 48, also rigidly mounted to the base 43 at 49, has a wheel 50, having an eccentric cranking handle 51, keyed to one end thereof and a pinion gear 52, having teeth compatible with rack 41, keyed to the other end. Thus, by manually cranking the handle 51 the pinion gear 52 is rotated and the rod 30 attached to the rack 41 is actuated horizontally in an amount directly proportional to the angle through which the crank is moved. A sleeve 53 is positioned in each opening 31 to prevent wear of the tank ceramic refractory sideblocks 32 by the rods 30, and a seal 54 prevents loss or contamination of the float atmosphere at the point where each rod 30 traverses the casing side plate 33.

Since each resistrictor tile is pivotally connected to a pair of rods, each of which may be independently and readily positioned, great ease and freedom of adjustment are imparted to the restrictor tiles. As illustrated in FIG. 2, the equal movement of each of the rods 25 results in a direct lateral movement of the tile 22. FIG. 3 shows how unequal movement of the shafts 25 may be used to pivot the tiles 22 and thereby adjust the angle of the tiles as needed.

Thus, by means of the invention, the tendency of the glass ribbon to veer to one side or the other as it advances along the bath may be controlled effectively by adjusting the position of the restrictor tiles as needed to compensate for any deviations. Also, by lateral adjustment, the amount of restriction can be altered.

The rods 30, along with the pivoting means 29, may be made of any material, such as stainless steel, suitable for an environmental temperature in the neighborhood of 1100° C. or more and an inert atmosphere such as a mixture of nitrogen and hydrogen which may be encountered in a conventional float glass bath.

I claim:

1. In a method of producing a continuous glass ribbon by the float process wherein molten glass is continuously deposited from a spout onto one end of an elongated bath of molten metal, the lateral flow of said molten glass being initially contained as it is deposited on said bath by diverging restrictor tiles at either edge of said spout and said molten glass flowing laterally as it advances between said diverging tiles to form said ribbon, the improvement comprising manipulating the transverse and angular position of said diverging restrictor tiles to regulate the lateral flow of said molten glass as it forms said ribbon and the direc- of movement of said ribbon to thereby direct said ribbon along the desired path over said elongated bath.

2. Method of producing a continuous glass ribbon by the float process as claimed in claim 1, including the step of maintaining by positive means the lateral and angular disposition of said tiles in any adjusted location.

3. In apparatus for producing a float glass ribbon including an elongated tank containing a bath of molten metal and spout means extending over one end of said bath for continuously depositing molten glass on said bath, the improvement comprising a movable restrictor tile disposed in said bath on either side of said spout, said restrictor tiles defining a diverging channel within which said molten glass is deposited from said spout, and means connected to each said tile for moving said tiles to selected lateral and angular positions to control lateral flow of said molten glass as it is deposited on said molten metal and spreads within said diverging channel to form said ribbon and to direct the ribbon formed from said molten glass along the desired path across said bath of molten metal.

4. Apparatus for producing float glass as claimed in claim 3, wherein said means for positioning each of said tiles includes a pair of horizontally disposed rods pivotally attached thereto at longitudinally spaced locations, said rods extending laterally through openings in the tank wall adjacent said tile, and means for independently advancing and retracting said rods to accomplish both lateral and angular adjustment of said tiles.

5. Apparatus for producing float glass as claimed in claim 4, wherein said advancing and retracting means is a manually operated rack and pinion.

6. Apparatus for producing float glass as claimed in claim 3, wherein a single tile is disposed on either side of said spout and extends longitudinally of the bath from the refractory facing of the entry end of said bath to a point beyond said spout, said single tiles imposing the only restriction on the lateral flow of said molten glass, and wherein said means moving said tiles allows both lateral and angular movement, thereby permitting both lateral and angular adjustment of said restriction along its entire length.

7. Apparatus for producing float glass as claimed in claim 6, wherein said tiles are substantially in the shape of right triangles.

8. Apparatus for producing float glass as claimed in claim 4, wherein said tiles are substantially in the shape of right triangles, the right angle thereof comprising first and second perpendicular edges, wherein said first edge is disposed substantially parallel the rear wall of the bath and said second edge is disposed substantially parallel the side wall thereof, and wherein said pair of rods are attached to said tile at points along and spaced inwardly from said second edge.

References Cited
UNITED STATES PATENTS

| | | | |
|---|---|---|---|
| 3,433,612 | 3/1969 | Dickinson et al. | 65—99 A |
| 3,492,107 | 1/1970 | Simpson et al. | 65—182 R |
| 3,528,795 | 9/1970 | Swillinger | 65—99 A X |

ARTHUR D. KELLOGG, Primary Examiner

U.S. Cl. X.R.

65—91, 182